(12) United States Patent
Huenermann

(10) Patent No.: US 8,245,543 B2
(45) Date of Patent: Aug. 21, 2012

(54) DEPOSITION BURNER AND METHOD FOR THE MANUFACTURE THEREOF, USE OF THE DEPOSITION BURNER AND METHOD FOR THE PRODUCTION OF A QUARTZ GLASS BODY BY USING THE DEPOSITION BURNER

(75) Inventor: Michael Huenermann, Alzenau (DE)

(73) Assignee: Heraeus Quarzglas GmbH & Co. KG, Hanzu (DE)

( * ) Notice: Subject to any disclaimer, the term of this patent is extended or adjusted under 35 U.S.C. 154(b) by 145 days.

(21) Appl. No.: 12/451,722

(22) PCT Filed: May 21, 2008

(86) PCT No.: PCT/EP2008/056222
§ 371 (c)(1),
(2), (4) Date: Nov. 25, 2009

(87) PCT Pub. No.: WO2008/145575
PCT Pub. Date: Dec. 4, 2008

(65) Prior Publication Data
US 2010/0132406 A1    Jun. 3, 2010

(30) Foreign Application Priority Data
May 25, 2007  (DE) .................. 10 2007 024 725

(51) Int. Cl.
*C03B 37/018* (2006.01)
(52) U.S. Cl. ............... 65/531; 65/393; 65/533; 65/537; 65/413
(58) Field of Classification Search .................. None
See application file for complete search history.

(56) References Cited

U.S. PATENT DOCUMENTS
4,368,063 A    1/1983  Presby
(Continued)

FOREIGN PATENT DOCUMENTS
DE           283452 A   * 10/1990
(Continued)

OTHER PUBLICATIONS
Machine Translation JP2000-104909.*
(Continued)

*Primary Examiner* — Matthew Daniels
*Assistant Examiner* — Lisa Herring
(74) *Attorney, Agent, or Firm* — Tiajoloff and Kelly LLP

(57) ABSTRACT

To provide a method for the inexpensive manufacture of a deposition burner with small manufacturing tolerances for use in the synthesis of quartz glass, and wherein moreover, when the deposition burner is used as intended, the risk of contamination of the quartz glass to be produced is low, the invention suggests the following method steps: (a) providing a start cylinder of quartz glass (40) which is mechanically provided with longitudinal bores (46, 47); (b) elongating the start cylinder with formation of a burner strand (42), the longitudinal bores being shaped as elongated channels extending in parallel with one another; (c) cutting the burner strand into pieces in the form of cylindrical quartz glass blocks (43), each being provided with passage lines extending in parallel with a central axis of the quartz glass block; and (d) manufacturing the deposition burner by using a respective one of such quartz glass blocks as burner head which has a proximal end and a distal end, the passage lines serving the supply of process media from the distal to the proximal, burner head end.

7 Claims, 3 Drawing Sheets

U.S. PATENT DOCUMENTS

Figure 3:
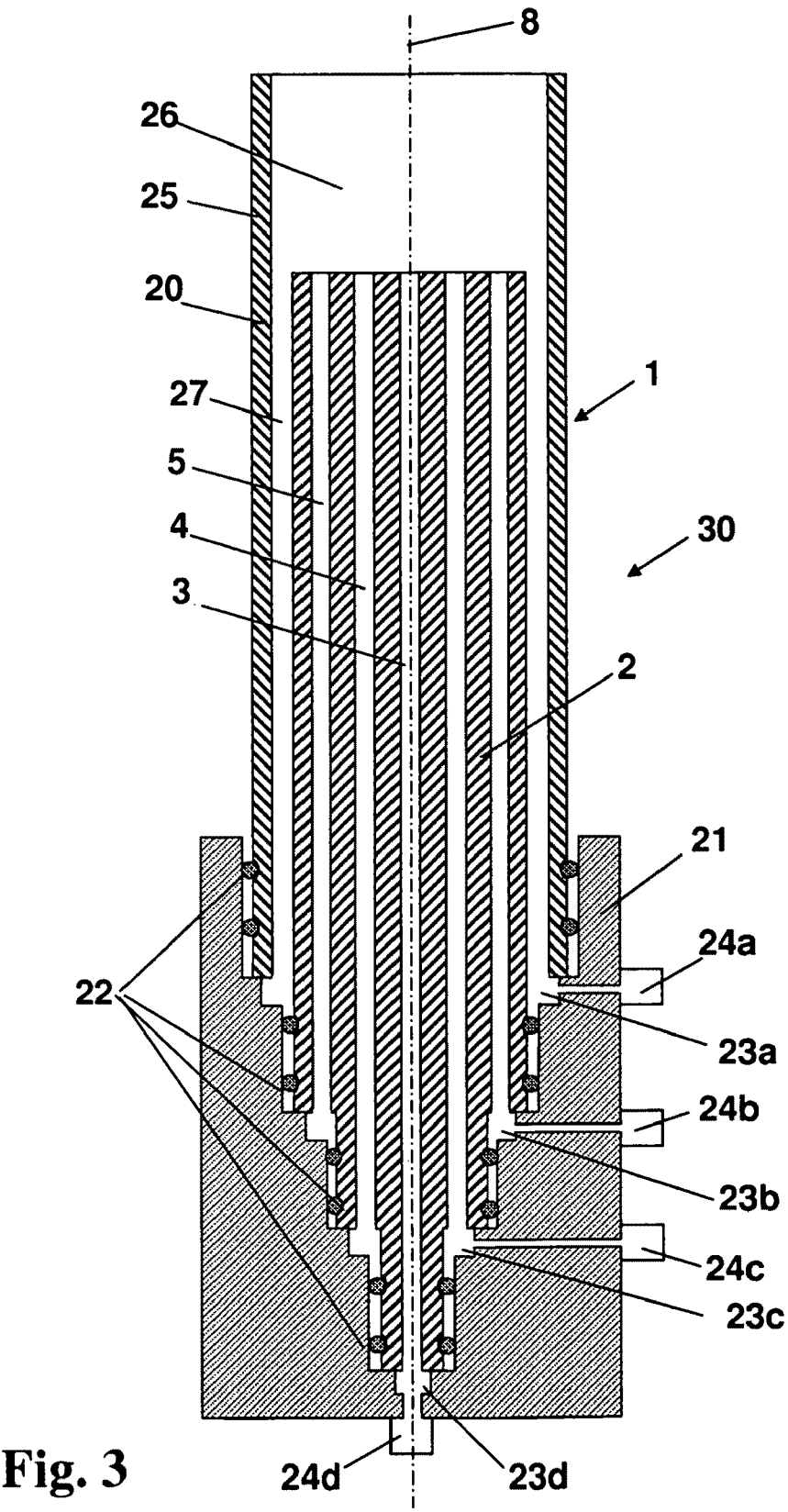

| | | | |
|---|---|---|---|
| 4,474,593 A | 10/1984 | Andrejco et al. | |
| 5,599,371 A | 2/1997 | Cain et al. | |
| 6,830,781 B2 | 12/2004 | Fabian | |
| 2002/0090465 A1 | 7/2002 | Fabian | |
| 2002/0104332 A1 | 8/2002 | Ruppert et al. | |
| 2003/0017429 A1* | 1/2003 | Cho | 431/8 |
| 2003/0019246 A2 | 1/2003 | Ruppert et al. | |
| 2004/0261460 A1* | 12/2004 | Roba et al. | 65/413 |
| 2006/0130528 A1* | 6/2006 | Nelson et al. | 65/379 |
| 2007/0204656 A1* | 9/2007 | Gallagher et al. | 65/379 |

FOREIGN PATENT DOCUMENTS

| | | |
|---|---|---|
| DE | 100 18 857 C1 | 11/2001 |
| DE | 100 55 362 C1 | 1/2002 |
| JP | 8059260 A | 3/1996 |
| JP | 2000104909 A | 4/2000 |
| JP | 3222841 B2 | 10/2001 |
| JP | 2002228121 A | 8/2002 |
| WO | WO 82/03345 | 10/1982 |

OTHER PUBLICATIONS espacenet English language abstract for JP 8059260 A published Mar. 5, 1996.

espacenet English language abstract for JP 2000104909 A published Apr. 11, 2000.

espacenet English language abstract for JP 3222841 B2 published Oct. 29, 2001.

espacenet English language abstract for JP 2002228121 A published Aug. 14, 2002.

* cited by examiner

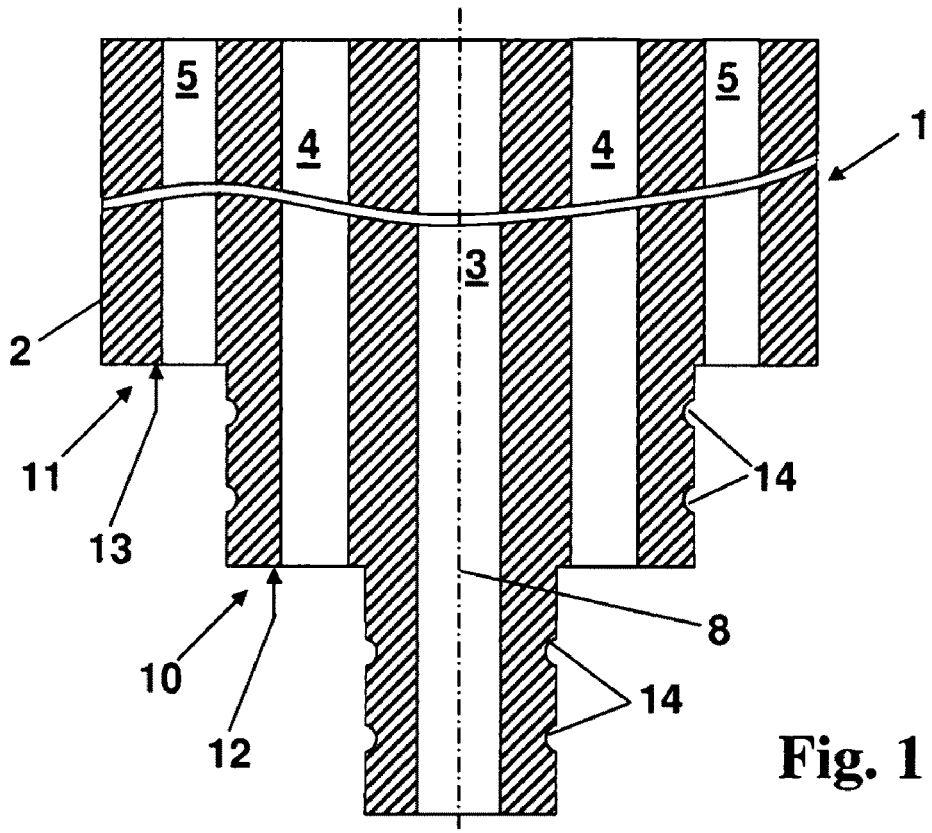
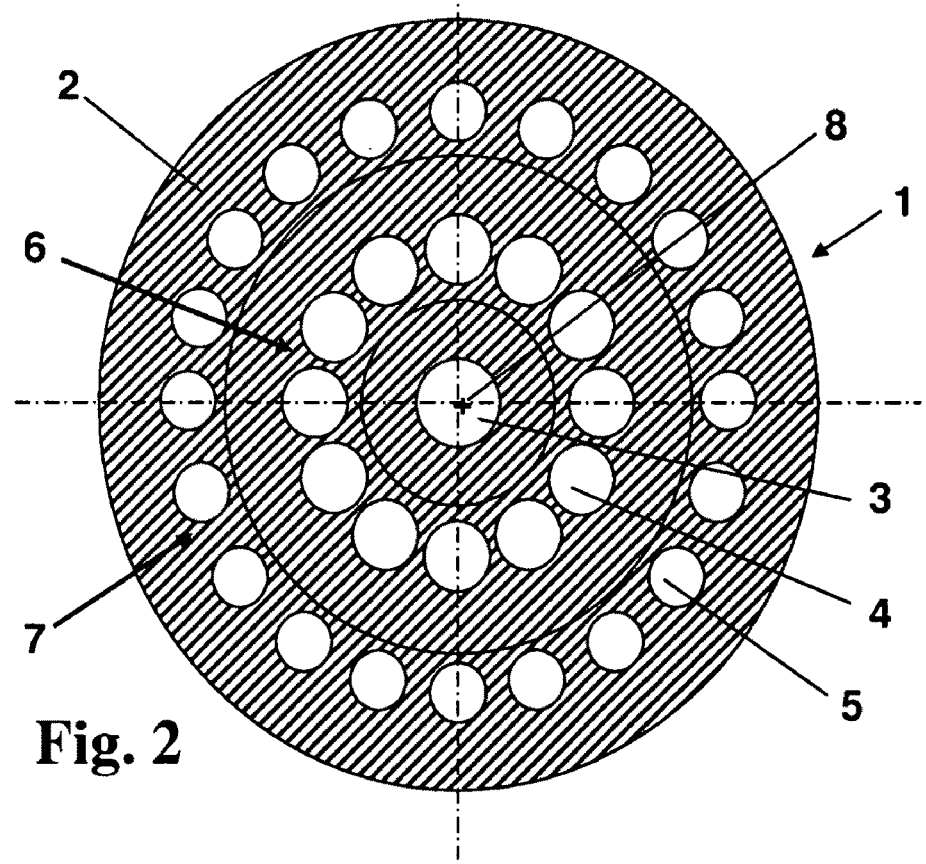

DEPOSITION BURNER AND METHOD FOR THE MANUFACTURE THEREOF, USE OF THE DEPOSITION BURNER AND METHOD FOR THE PRODUCTION OF A QUARTZ GLASS BODY BY USING THE DEPOSITION BURNER

The present invention refers to a method for the manufacture of a deposition burner for use in the manufacture of synthetic quartz glass.

Moreover, the present invention refers to a deposition burner of quartz glass for use in the manufacture of synthetic quartz glass, the deposition burner comprising a burner head having a proximal end and a distal end.

Furthermore, the present invention refers to a use of the deposition burner according to the invention.

Moreover, the present invention is concerned with a method for the manufacture of a body of synthetic quartz glass in that process media are supplied to a deposition burner, $SiO_2$ particles are formed therefrom and said particles are deposited layer by layer on a carrier with formation of an $SiO_2$ blank.

TECHNICAL BACKGROUND

In the manufacture of quartz glass bodies according to the so-called OVD (outside vapor deposition) method, $SiO_2$ particles are formed by flame hydrolysis by using one or more deposition burners and are deposited on the outer or circumferential surface of a carrier rotating about its longitudinal axis, resulting in the formation of a cylindrical blank of transparent or porous quartz glass. The deposition burners used for this purpose consist of quartz glass or of metal.

To accelerate the deposition process, several deposition burners are frequently used that are reversingly moved along the blank in a joint row of burners, each deposition burner only sweeping over part of the length of the blank. Especially with blanks consisting of porous quartz glass (so-called "soot bodies"), particular attention is paid that all of the deposition burners show deposition characteristics that are as uniform as possible because, otherwise, this would result in a locally irregular soot density or soot quantity, which leads to axial geometric variations and inhomogeneities of the material and to disturbances particularly in the contact area between neighboring deposition zones. Therefore, a great number of measures have been described for ensuring uniform and reproducibly adjustable deposition characteristics of the deposition burners.

DE 100 18 857 A1, for instance, suggests a deposition burner of quartz glass which consists of four concentrically arranged quartz glass tubes forming a central nozzle surrounded by a total of three annular gap nozzles. The central nozzle is fed with $SiCl_4$, and the outer annular gap nozzles with fuel gases in the form of hydrogen and oxygen. The central nozzle and the outer portion have provided thereinbetween a separation gas nozzle through which an oxygen flow is passed that shields the $SiCl_4$ stream against the fuel gas streams. To exchange burners of a row of burners without any great matching and adjusting efforts, attention is paid in each of the deposition burners to an exact dimensional accuracy of the annular gaps and each of the deposition burners is equipped with a separate positioning unit.

WO 82/03345 discloses a different deposition burner of quartz glass for the fabrication of preforms for optical fibers according to the VAD method. This burner is composed of a multitude of quartz glass tubes arranged in coaxial fashion relative to one another so that a plurality of annular gap nozzles surround a central middle nozzle. At the distal end facing away from the burner mouth the quartz glass tubes are offset in stepped fashion and are fixed in a metallic holder. Inside the holder annular chambers are formed that are fluidically separated from one another and sealed outwards and communicate with the middle nozzle and the annular gap nozzles. Process media are supplied via these chambers to the nozzles.

A similar coaxial burner for the fabrication of preforms according to the VAD method is also known from U.S. Pat. No. 4,474,593 A. This burner has the special feature that the inner nozzle is supported to be displaceable in the direction of the longitudinal axis, so that its position can be varied relative to the remaining annular nozzles during the deposition process. The individual annular nozzles terminate in the area of the burner mouth either in a joint plane or in stepped planes.

JP-8-059260 A discloses a method for making a generic burner. The publication suggests the manufacture of a quartz glass body by elongating a coaxial assembly of quartz glass tubes. The resulting product is usable as an insulating tube for a thermocouple, as a protecting tube for a sensor or a heater, as a gas supply tube, as a member for instruments, as a member for holding wafers in the manufacture of semiconductors, or as a burner head.

In the known deposition burners of quartz glass, contamination of the $SiO_2$ soot body by abrasive wear from the material of the nozzles need not be feared. On the other hand, precise fabrication and orientation of the individual quartz glass tubes is complicated, especially when traditional glass-blowing methods have to be employed. Likewise, it is troublesome to compensate for possible differences in the burner characteristics by positioning the deposition burners individually.

As an alternative, deposition burners are used consisting of special steel or aluminum. Such a metal burner is e.g. known from U.S. Pat. No. 5,599,371 A. The deposition burner is composed of a multitude of metallic nozzle parts which are interconnected by means of screws and form gas chambers fluidically separated from each other.

Since in deposition burners of metal the individual nozzle parts can be manufactured in a precise and reproducible manner by way of the known mechanical machining methods such as drilling, punching, milling, or the like, complex constructions with narrow manufacturing tolerances can also be realized in a comparatively easy way. For series manufacture specifically adapted tools are normally used, the production of which presents a considerable cost factor. A complex burner construction requires the provision of a great number of such tools that, however, as has been shown, are subject to rapid wear due to the hardness of the metallic material, whereby the manufacturing precision is decreasing. Moreover, contamination of the quartz glass by constituents of the high temperature-resistant metallic material must be expected in metal burners.

OBJECT OF THE INVENTION

It is therefore the object of this invention to provide a deposition burner, and a method for the manufacture thereof, which can be manufactured with small manufacturing tolerances at low costs and in the case of which the risk of contamination during the intended use is small at the same time. Furthermore, it is the object of the present invention to indicate a suitable use of the deposition burner according to the invention as well as a reproducible method for making a homogeneous body of synthetic quartz glass by using a flame hydrolysis burner according to the invention.

As for the method for manufacturing the deposition burner, this object is achieved by a method comprising the following steps:
(a) providing a start cylinder of quartz glass which is mechanically provided with longitudinal bores;
(b) elongating the start cylinder with formation of a burner strand, the longitudinal bores being shaped as elongated channels extending in parallel with one another;
(c) cutting the burner strand into pieces in the form of cylindrical quartz glass blocks, each being provided with passage lines extending in parallel with a central axis of the quartz glass block; and
(d) manufacturing the deposition burner by using a respective one of such quartz glass blocks as burner head which has a proximal end and a distal end, the passage lines serving the supply of process media from the distal to the proximal burner head end.

The deposition burners produced in this way are used for the synthesis and deposition of $SiO_2$ particles by flame hydrolysis or by other deposition methods, such as plasma enhanced deposition methods. The deposition burners are suited for both the manufacture of $SiO_2$ soot bodies and the manufacture of blanks of transparent quartz glass with simultaneous deposition and vitrification of the $SiO_2$ particles.

For the manufacture of the deposition burner a start cylinder of quartz glass is started from. This is either a hollow cylinder or a solid cylinder. In this cylinder a multitude of longitudinal bores are mechanically formed, said bores having longitudinal axes extending in parallel with the longitudinal axis of the cylinder. In the simplest case the longitudinal bores have a circular cross-section and they are distributed around the cylinder axis of the start cylinder symmetrically or asymmetrically. They extend from a front end of the start cylinder to the opposite end or they are closed at one side. An advantage of the last-mentioned embodiment during elongation of the base body according to method step (b) will be explained in more detail further below.

The start cylinder prepared in this way is elongated by drawing it in the direction of the cylinder axis to several times its original length to obtain a burner strand. The longitudinal bores that are not collapsing in this process are thereby extended lengthwise, whereupon they form channels extending in parallel with the longitudinal axis of the cylinder. In the burner strand obtained in this way, the nozzle geometry of the finished deposition burner is thereby predetermined fully or in part.

The longitudinal bores in the start cylinder of quartz glass are produced by mechanical treatment or machining. With the known machining methods, such as drilling, milling, or the like, it is possible to form bores, grooves, channels, or the like, in the quartz glass of the start cylinder in a precise and reproducible way, so that complex constructions with narrow manufacturing tolerances can also be realized comparatively easily. Likewise, the outer dimensions of the start cylinder can be precisely adjusted by mechanical treatment. In this respect the method according to the invention exploits the advantages of a metal burner in terms of dimensional accuracy. In addition, the corresponding mechanical treatment of the start cylinder is only needed over a short length, as compared with the length of the burner strand, so that the wear of the cutting tools needed for this is kept within limits and little time is spent on account of the number of the burner heads obtained in the end with a path of the channels formed therein that is many times longer.

Moreover, the channels shaped by elongation comprise a smooth inner wall produced in the melt flow, which facilitates a laminar flow of process media therethrough that counteracts the formation of deposits and reduces abrasion of the inner wall.

Pieces in the form of cylindrical quartz glass blocks are cut to length from the burner strand. In each of the quartz glass blocks the burner strand channels are present as passage lines that are open at both sides and extend in parallel with the central axis of the quartz glass block.

The quartz glass block produced in this way is further processed into a burner head for a deposition burner, at least part of the passage lines serving as supply lines for process media such as glass start material, fuel gas or oxygen.

"Burner head" in the present case means the part of the deposition burner facing the burner flame, in which the passage lines for the supply of the process media extend and terminate at the burner mouth in the form of nozzle orifices.

The burner heads manufactured in this way are distinguished by high dimensional accuracy. The radial dimensions of the start cylinder are several times greater than those of the elongated burner strand, which makes it easier to observe predetermined dimensions. Possible size variations and angle errors in the start cylinder are scaled down by the elongating process. The quartz glass blocks manufactured from the burner strand are therefore distinguished by high dimensional accuracy, and the quartz glass blocks obtained from one and the same burner strand are almost identical. A later treatment of the nozzles themselves is in general not needed or even undesired.

Thus the method according to the invention enables an inexpensive series production of deposition burners of quartz glass with the same or at least very similar dimensions. This facilitates the use of the deposition burners produced according to the invention in a burner assembly for making quartz glass, particularly soot bodies, wherein identical or similar deposition characteristics of the deposition burners result in small density and mass variations in the area of the turning points of the reversing movement of the burner assembly.

It has turned out to be advantageous when a start cylinder is used having a cylindrical circumferential surface provided with longitudinal grooves that extend in the direction of the longitudinal axis of the cylinder and are surrounded by a cladding tube.

The longitudinal grooves surrounded by a cladding tube form cavities which are shaped into channels during elongation. Prior to elongation of the start cylinder, or during elongation at the latest, the cladding tube and the start cylinder are fused with one another. The longitudinal grooves extend along the longitudinal axis of the start cylinder, namely over the whole length thereof or over part thereof.

The cladding tube which envelops the grooves can also be configured again as a start cylinder in this sense, which means that its jacket surface is provided with longitudinal grooves and surrounded by a further cladding tube. Therefore, a procedure is also preferred where the outer jacket surface of the cladding tube is provided with longitudinal grooves which extend in the direction of the longitudinal axis of the cladding tube and which are surrounded by an outer tube.

A hollow cylinder with a central middle bore can also be used as the start cylinder. The central bore in the finished deposition burner forms the central middle nozzle which is surrounded by a multitude of further passage lines, of which at least some are produced prior to elongation by way of bores or longitudinal channels (grooves) in the wall of the hollow cylinder. The further nozzles are normally configured as individual nozzles, also in the form of nozzle rims, and/or as annular nozzles surrounding the central nozzle.

A variant of the method has turned out to be particularly advantageous, wherein the longitudinal bores are closed at one side during elongation of the start cylinder.

In the simplest case the cavities are configured as blind holes. However, they may also be closed by plugs or by fusion-sealing. The closure at one side makes it easier to control the pressure during elongation and reduces the introduction of impurities, particularly during the initial drawing process.

Furthermore, it has turned out to be useful when the manufacture of the deposition burner comprises a method step in which at the distal end of the burner head surrounding steps are laterally recessed such that those passage lines that extend at the same distance around the central axis of the quartz glass terminate at the same step.

The massive quartz glass block manufactured from the burner strand can be machined in a relatively easy way and true to size, for instance by grinding or cutting. In the preferred variant of the method, the distal end of the burner head is stepped by recessing laterally surrounding steps in different planes into the cylinder jacket to such an extent that the steps intersect those passage lines that extend each at the same distance around the central axis of the quartz glass block. The corresponding passage lines are individual channels that form a "nozzle rim" around the central axis and are designed for the supply of the same process medium. The process medium is supplied via a carrier body which is fastened to the distal end of the burner head and which is provided with channels which are in fluid communication with the passage lines and are otherwise sealed to the environment.

A procedure has turned out to be useful in which the manufacture of the deposition burner comprises a method step in which the proximal end of the burner head is provided with an outer cladding projecting in the direction of the central axis.

The final deposition burner is provided with an outer projection in this embodiment. It has been found that such a projection may have an advantageous impact on the deposition characteristics of the deposition burner. The outer cladding is either adhered to the outer wall of the remaining burner head or it is additionally received and fixed in a carrier body, as has already been mentioned above, for receiving the burner head.

For applications in the case of which it is advantageous to use a deposition burner with a focusable burner flame, the burner head may be provided with a tapering proximal end, for example by local softening and drawing.

As for the burner head, the above-mentioned object, starting from a deposition burner of the above-indicated type, is achieved according to the invention in that the burner head comprises a cylindrical quartz glass block, in which a plurality of passage lines of circular cross-section for the supply of process media extend in parallel with and at the same distance around a central axis of the quartz glass block, each of the passage lines having an inner wall shaped without tools in the melt flow, with surrounding steps being laterally recessed at the distal end of the burner head such that passage lines terminate at the same distance around the central axis of the quartz glass block at a joint step.

The deposition burner comprises one or several passage lines for the supply of a silicon-containing start material so that it is usable for the synthesis and deposition of $SiO_2$ particles by way of flame hydrolysis or by other deposition methods, such as plasma enhanced deposition methods. The deposition burner is suited for both the manufacture of $SiO_2$ soot bodies and the manufacture of blanks of transparent quartz glass by simultaneously depositing and vitrifying the $SiO_2$ particles.

The deposition burner according to the invention is provided with a burner head which is distinguished by the following essential features.

(1) The essential component of the burner head is a massive quartz glass block which has formed therein a plurality of passage lines extending from the distal end to the proximal end of the burner head and in parallel with the central axis of the quartz glass block. In this respect an alignment of separate nozzle parts relative to one another, as for example in the known coaxial burners, is not needed, and also the mounting, positioning and aligning of the complete deposition burner is simplified. The quartz glass block is preferably obtained with the help of the above-described method, i.e. by elongation of a mechanically drilled start cylinder into a burner strand, in which the nozzle geometry of the finished deposition burner is predetermined fully or in part, and by cutting a multitude of quartz glass blocks to length from said burner strand. This yields identical or almost identical burner heads of high dimensional accuracy.

(2) The passage lines are individual channels of circular cross-section and they have a smooth inner surface produced in the melt flow. This facilitates a laminar flow of process media therethrough, avoids deposits and reduces wear.

(3) The distal end of the burner head is stepped. The passage lines which extend at the same distance around the central axis of the quartz glass block and form the "nozzle rims" around the central inner bore begin (or end) at the radially surrounding steps. The stepped configuration at the lower end facilitates the supply of the process media to the burner head through a carrier which receives the stepped end and in which supply channels are formed for the process media.

In this context it has turned out to be particularly useful when the distal end of the burner head is received in a carrier body which is formed with several annular chambers for the supply of process media which are fluidically connected to the passage lines and are sealed to the outside.

Process media are supplied to the passage lines via the preferably metallic carrier body. To this end the carrier body is provided with annular chambers which are sealed relative to the remaining chambers and the environment.

It has turned out to be advantageous when the quartz glass block has a round cross-section. A round cross-section can be kept relatively easily and can be sealed to the environment.

It has also turned out to be advantageous when the proximal end of the burner head is provided with an outer cladding projecting in the direction of the central axis of the quartz glass block.

The outer cladding forms an outer projection. It has been found that such a projection may have an advantageous impact on the deposition characteristics of the deposition burner.

The outer cladding is either attached to the outer wall of the remaining burner head. Preferably, however, it is received and fixed in a carrier body for accommodating the burner head.

The improve the focusing properties of the deposition burner, the burner head may have a tapering proximal end.

Due to the separation from the burner strand the proximal end may show surface defects. To remove said defects, the proximal end of the burner head is preferably flame-polished. Due to flame polishing the smooth surface reduces the adhesion of impurities, minimizes disturbances of the gas flow in the area of the burner mouth and avoids flaking.

As for the use, the above-indicated object is achieved in that deposition burners according to the invention are used for producing a soot body of synthetic quartz glass with a homogeneous density distribution in that a plurality of deposition burners are used in a burner assembly which is reversingly movable along the circumferential surface of a carrier which is rotatable about its longitudinal axis.

The deposition burners according to the invention are each made from a massive cylindrical quartz glass block. Since each of the quartz glass blocks is obtained as a piece of an elongated burner strand, all of the quartz glass blocks and thus all of the burner heads are almost identical in their geometry, so that the individual deposition burners of the burner assembly show identical or similar deposition characteristics.

Moreover, the manufacture of the quartz glass blocks requires comparatively little efforts for the mechanical treatment of the corresponding start cylinder.

Moreover, the passage lines formed by elongation comprise a smooth inner wall of circular cross-section produced in the melt flow, which facilitates a laminar flow of process media therethrough.

Thanks to the massive quartz glass block an alignment of separate nozzle parts relative to one another, as is for example the case with the known coaxial burners, is not needed, and also the mounting, positioning and aligning of the complete deposition burner is simplified.

The use of such deposition burners in a joint burner assembly is thus particularly suited for the manufacture of soot bodies with a homogeneous density distribution, wherein identical or similar deposition characteristics of the deposition burners reduce density and mass variations in the area of the turning points of the reversing movement of the burner assembly.

With a view to similar deposition characteristics of neighboring deposition burners, it has turned out to be particularly useful when the burner heads of all deposition burners of the row of burners are made from quartz glass blocks deriving from the same burner strand.

Quartz glass blocks deriving from the same burner strand are almost identical in their dimensions.

In this respect a further improvement will be achievable if the burner heads of neighboring deposition burners are made from quartz glass blocks which derive from adjoining pieces of the burner strand.

Neighboring pieces of the burner strand differ from one another very little. Ideally, all of the deposition burners inside the burner assembly are arranged in the same order or sequence in which they are removed from the elongated burner strand. A further improvement with respect to a high similarity of the deposition characteristics of the deposition burners is achieved when the quartz glass blocks that are cut to length from the elongated burner strand have an orientation in the drawing direction in the sense that each of them has a lower end and an upper end and that the quartz glass blocks are arranged in the deposition burners in the same orientation.

As for the method for manufacturing a body of synthetic quartz glass, the above-indicated object, starting from a method of the above-indicated type, is achieved according to the invention in that providing the deposition burner comprises the following method steps:
  (a) providing a start cylinder of quartz glass which is mechanically provided with longitudinal bores;
  (b) elongating the start cylinder with formation of a burner strand, the longitudinal bores being shaped as elongated channels extending in parallel with one another;
  (c) cutting the burner strand into pieces in the form of cylindrical quartz glass blocks, each being provided with passage lines extending in parallel with a central axis of the quartz glass block; and
  (d) manufacturing the deposition burner by using a respective quartz glass block as burner head which has a proximal end and a distal end, the passage lines serving the supply of process media from the distal to the proximal burner head end.

The method according to the invention is superior to known methods for making synthetic quartz glass due to the use of a quartz-glass deposition burner of high geometrical accuracy.

The deposition burner is manufactured from a massive cylindrical quartz glass block which is obtained as a piece of a burner strand, and said strand, in turn, is produced by elongating a start cylinder of quartz glass comprising a multitude of mechanically produced longitudinal bores. Thanks to the massive quartz glass block separate nozzle parts need not be aligned relative to one another, as is the case with the known coaxial burners, and also the mounting, positioning and aligning of the complete deposition burner is simplified.

Apart from the high geometrical precision of the deposition burner obtained in this way, said burner is also distinguished in that the passage lines shaped by elongation comprise a smooth inner wall of circular cross-section produced in the melt flow, which facilitates a laminar flow of process media therethrough, which has an advantageous impact on the homogeneity of the $SiO_2$ blank obtained.

Particularly preferred is a method variant in which a plurality of deposition burners arranged in a joint row of burners are used that are reversingly moved along the circumferential surface of a carrier rotating about its longitudinal axis, with $SiO_2$ particles being deposited by means of the deposition burners on the carrier with formation of a substantially cylindrical blank of porous $SiO_2$.

As has been discussed further above, the deposition burners can be produced in a reproducible way and can be optimized with respect to identical or similar deposition characteristics. With an application for depositing $SiO_2$ particles on a deposition surface by using an arrangement of a plurality of deposition burners in a burner assembly moved in synchronism and reversingly along the deposition surface, this particular feature contributes to small density and mass variations of the $SiO_2$ blank obtained. Particularly in the area of the turning points of the reversing movement of the burner assembly, this prevents or reduces disturbances.

PREFERRED EMBODIMENT

Figure 4:
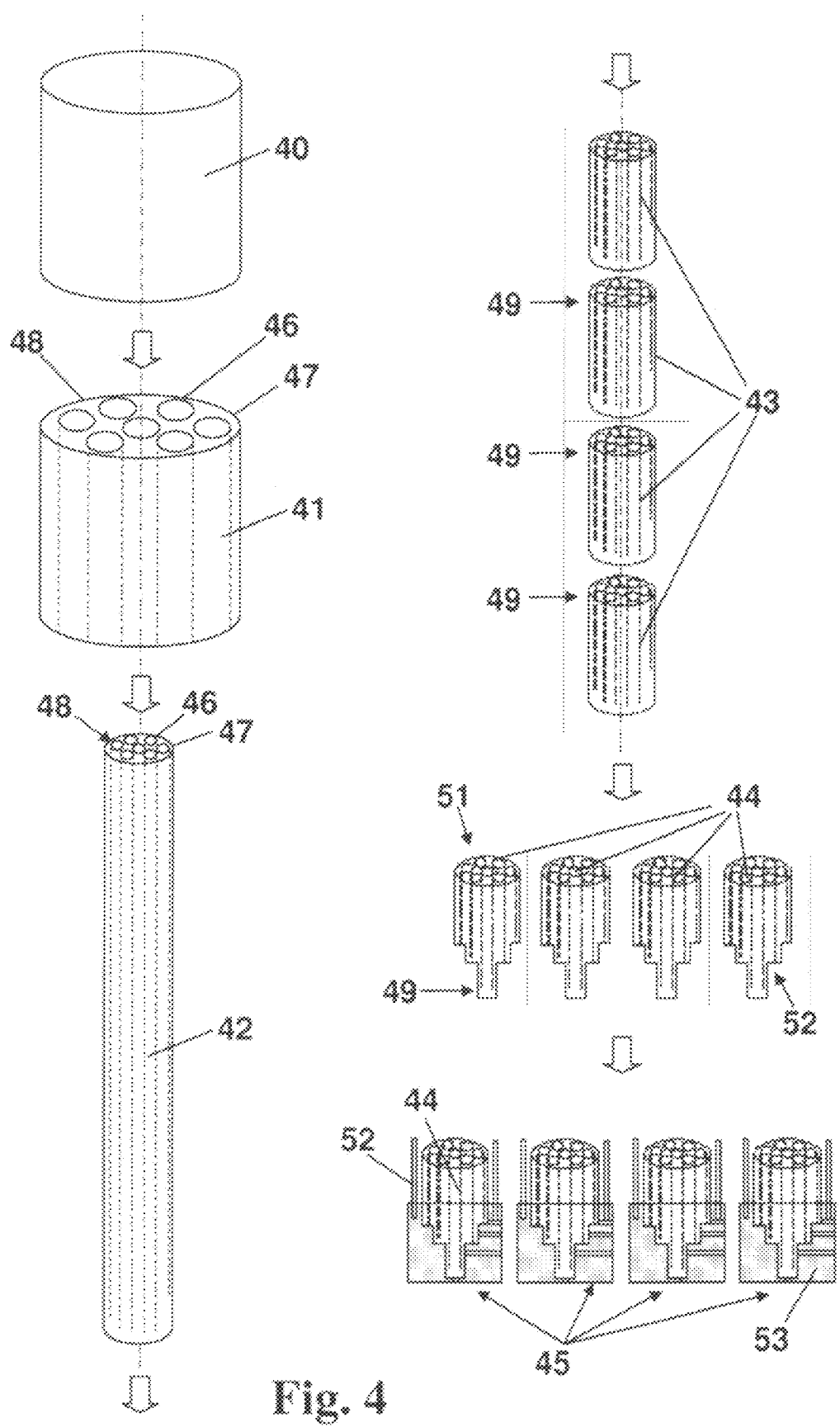

The present invention shall now be explained in more detail with reference to an embodiment and a drawing, which schematically shows in detail in FIG. 1 the distal end of the burner head in an embodiment of the deposition burner according to the invention, in a longitudinal section;

FIG. 2 a radial cross-section of the deposition burner according to FIG. 1;

FIG. 3 an assembly drawing of the deposition burner according to FIG. 1 and FIG. 2, in a longitudinal section; and FIG. 4 a schematic illustration for explaining the process sequence in a procedure according to the invention for producing a deposition burner.

FIGS. 1 and 2 illustrate different views of the burner head 1 of an oxyhydrogen burner for producing an $SiO_2$ soot body according to the OVD method.

The burner head 1 consists of a massive burner base body 2 of synthetic quartz glass, which is configured to be substantially in rotational symmetry with respect to the longitudinal axis 8. The massive burner base body 2 accommodates a central nozzle 3, an inner nozzle rim 6 (see FIG. 2) and an outer nozzle rim 7 (see FIG. 2). The nozzle rims 6, 7 are formed from nozzle channels 4, 5 of circular cross-section which extend in parallel with the central nozzle 3. The nozzle channels 4 of the inner nozzle rim 6 and the nozzle channels 5 of the outer nozzle rim 7 have each the same distance from the central nozzle 3, so that the nozzle rims 6, 7 extend in coaxial fashion relative to the central nozzle 3 and the central axis 8.

The central nozzle 3 serves to supply glass start material, such as $SiCl_4$ and oxygen, and hydrogen and oxygen are supplied via the nozzle rims 6, 7.

The outer contour of the burner base body 2 can be manufactured by means of the known mechanical treatment methods with small manufacturing tolerances in an easy way and at low costs. FIG. 1 shows that the lower end of the burner base body 2 is stepped, with two radial shoulders being laterally recessed (by way of grinding) such that a pin with the central nozzle 3 projects downwards, said pin being surrounded by two annular steps 10, 11 in the annular surfaces 12, 13 of which the inner nozzle rim 4 and the outer nozzle rim 5 terminate. The axial circumferential surfaces of both steps 10, 11 are ground to size and provided with grooves 14 for accommodating sealing rings (FIG. 3).

The assembly drawing of the inventive deposition burner 30 of FIG. 3 substantially shows three subassemblies, namely the burner base body 2 with the nozzle channels 4, 5 and the central nozzle 3 formed therein, an outer tube 20 made of synthetic quartz glass and a burner carrier body 21 made of special steel.

The burner carrier body 21 is mounted at the distal end of the burner base body 2 and serves to supply the process media to the nozzles 3, 4, 5 and for accommodating and mounting the burner head 1, which in the embodiment is composed of burner base body 2 and outer tube 20.

Each process medium has assigned thereto an annular chamber 23a, 23b, 23c, 23d within the burner carrier body 21, each chamber being provided with a gas connection 24a, 24b, 24c, 24d. The annular chambers 23a, 23b, 23c, 23d enable a radially uniform supply of the process media into the corresponding nozzles 3, 4, 5.

Furthermore, the burner carrier body 21 comprises stops for the burner base body 2, the stops permitting an exact axial positioning of the burner base body 2. A positioning means, not shown (in FIG. 3), for the deposition burner 1 also acts on the burner carrier body 21.

The outer tube 20 forms a projection 25 of 20 mm relative to the burner mouth 26 and an annular gap 27 of about 2 mm relative to the cylindrical circumferential surface of the burner base body 2. Said annular gap 27 serves to supply combustion oxygen. In the area of reception in the burner carrier body 21 the outer jacket of the outer tube 20 is provided with radially surrounding grooves for receiving O-rings 22 and is ground to size to form a fit with corresponding accommodation in the burner carrier body 21. The face of the burner base body 2 forming the burner mouth 26 is flame-polished.

The burner base body has an outer diameter of 19.5 mm and a length of 16 cm. The central nozzle 3 has a diameter of 2.5 mm. The front step 10 has an outer diameter of 6 mm. The inner nozzle rim 6 which terminates in the area of the front step 10 and is used for the supply of oxygen is formed by a total of twelve nozzle channels 4, each having a diameter of 1.5 mm, with the nozzles being uniformly distributed over a diameter of 8 mm around the central axis 8. The step length in the direction of the central axis 8 is 2 cm.

The rear step 11 in which the channels of the outer nozzle rim 7 for the supply of hydrogen terminate has an outer diameter of 12 mm and a radial step depth of 3 mm. The outer nozzle rim 7 is formed by a total of 20 nozzle channels 5, each having a diameter of 1.5 mm, which extend over an enveloping circle with a diameter of 14 mm around the central axis 8.

The method of the invention for manufacturing a deposition burner 45 according to the invention shall now be explained in more detail with reference to an example and to FIG. 4.

A solid-cylinder semifinished product 40 of round cross-section is prepared, the semifinished product having an outer diameter of 100 mm and a length of 30 cm. The semifinished product 40 is centrally provided with a bore 46 having a diameter of 12.5 mm. Another twelve bores 47, each having a diameter of 7.5 mm, are placed around the inner bore 46 and form an inner bore rim 48, as well as another twenty bores (not shown in the schematic FIG. 4), each having a diameter of 7.5 mm, which form an outer bore rim.

The semifinished product 41 provided with bores in this way is drawn to 25 times its length, resulting in a burner strand 42 having an outer diameter of 20 mm and a nominal length of 7.5 m. The burner strand 42 is cut to pieces having a length of 16 mm, so that, minus final losses, about forty blanks 43 for burner base bodies 2 are obtained. The blanks 43 are here consecutively numbered, and the respectively rear end 49 of the blank, at which the blank 43 is cut off from the burner strand 42, is marked.

The blanks 43 are subsequently ground to an outer diameter of 19.5 mm, and two steps 50 of a length of 2 cm each and with outer diameters of 12 mm and 6 mm respectively, are recessed at the marked rear end 49. Furthermore, grooves are provided for receiving sealing rings, as has been explained further above with reference to the description of the burner according to the invention.

Finally, the burner head surface 51 is flame-polished and the burner base body 44 and the outer tube 52 are inserted into the burner carrier body 53.

The method according to the invention shall now be explained in more detail with reference to an example illustrating the manufacture of an $SiO_2$ soot body according to the OVD method as a precursor for a preform for optical fibers using the deposition burner according to the invention.

Ten deposition burners are mounted at a distance of 15 cm on a joint row of burners, the deposition burners being arranged in the order of their numbers when removed from the burner strand. The deposition burners are oriented towards the cylindrical circumferential surface of a substrate body rotating about its longitudinal axis.

The row of burners is moved with an amplitude of movement of 15 cm in reversing fashion along the substrate body. For the ignition of an oxyhydrogen flame and for the formation and deposition of $SiO_2$ particles on the cylindrical circumferential surface of the substrate body, the deposition burners are fed with glass start material and fuels as follows:

32.5 g/min $SiCl_4$ and 2.0 l/min carrier gas oxygen are passed through the central nozzle 3, a total of 4.5 l/min separation gas oxygen each through the separation gas nozzles 4, a total of 46.0 l/min hydrogen through the hydrogen nozzles 4, and a total of 6.2 l/min oxygen through the oxygen nozzles 27.

After the carrier has been removed, an $SiO_2$ soot body is obtained and said body is cleaned according to generally known methods and is subsequently subjected to an after-treatment under oxidizing conditions in an oxygen-containing atmosphere and thereafter sintered to obtain a hollow cylinder of quartz glass.

The invention claimed is:

1. A method for manufacturing a deposition burner for use in the manufacture of synthetic quartz glass, the method comprising the following steps:
   (a) providing a start cylinder of quartz glass that is mechanically provided with longitudinal bores;
   (b) elongating the start cylinder so as to form a burner strand, wherein the longitudinal bores form elongated channels extending in parallel with one another in the burner strand;
   (c) cutting the burner strand into pieces in the form of cylindrical quartz glass blocks, wherein, in each quartz glass block, the elongated channels form passage lines extending in parallel with a central axis of the quartz glass block; and
   (d) manufacturing the deposition burner using one of the quartz glass blocks as a burner head, said burner head having a proximal end and a distal end, the passage lines being configured to supply process media from the distal end to the proximal end of the burner head; and
   wherein the manufacturing of the deposition burner comprises laterally recessing the distal end of the burner head by mechanical grinding of the quartz glass block so that the burner head has a surrounding step such that the passage lines that are located at a first distance from the central axis of the quartz glass block all terminate at said surrounding step.

2. The method according to claim 1, wherein the start cylinder has an outer circumferential surface provided with longitudinal grooves that extend in the direction of the longitudinal axis of the cylinder and are surrounded by a cladding tube.

3. The method according to claim 2, wherein the outer circumferential surface of the cladding tube is provided with additional longitudinal grooves that extend in the direction of the longitudinal axis of the cladding tube and are surrounded by an outer tube.

4. The method according to claim 1, wherein the longitudinal bores are closed at one side during the elongation of the start cylinder.

5. The method according to claim 1, wherein the manufacturing of the deposition burner comprises providing the proximal end of the burner head with an outer cladding projecting in the direction of the central axis.

6. The method according to claim 1, wherein the step is substantially annular.

7. The method according to claim 1, wherein the recessing is such that the distal end of the burner head has at least two surrounding steps, and the passage lines that are located at a second distance from the central axis of the quartz glass block all terminate at one of the surrounding steps different from the surrounding step at which passage lines at the first distance terminate.

* * * * *